United States Patent Office 3,651,202
Patented Mar. 21, 1972

3,651,202
PRODUCTION OF PLASTIC CONTAINERS
Erwin M. Raabe, Westfield, N.J., assignor to Rheem
Manufacturing Company, New York, N.Y.
Filed Mar. 31, 1970, Ser. No. 24,238
Int. Cl. B29d 23/13
U.S. Cl. 264—292
1 Claim

ABSTRACT OF THE DISCLOSURE

Hollow cup-shaped thermoplastic containers are formed by drawing material from a sheet blank of thermoplastic material into a die cavity with a plunger to form the wall section of the container. The partly-formed container is then placed in an inverted position on a mandrel, and the bottom section of the container is formed by working the bottom section material against the mandrel.

BACKGROUND OF THE INVENTION

It is known to form relatively deep containers of thermoplastic material, e.g., plastic pails, in a single operation. One such method involves a deep draw operation wherein a blank sheet of thermoplastic material covering the opening of a female die element is expanded into the die element with a plunger. Such procedure may employ additional drawing assist means in the form of a vacuum applied in the die element and the blank sheet may be preheated to just below molten condition to enhance the drawing operation. However, such single stage processing is not completely satisfactory for forming relatively deep containers in that such processing too often results in warpage in the pail especially the bottom section thereof. Further more, unsatisfactory variation in container wall thickness frequently occurs, and the overall effect is to reduce the compression resistance and capacity of the container. A particular disadvantage of such known single step methods is the susceptibility of the container to failure under loading due to weakening at its wall section-bottom-section juncture.

SUMMARY OF THE INVENTION

The present invention is concerned with an improved method with which relatively deep cup-shaped containers, more particularly large containers such as pails, can be produced. The invention provides that the containers produced thereby have optimum strength characteristics, generally uniform wall thickness and minimum deviation from intended configuration.

In accordance with the invention a blank material of thermoplastic material is held in covering position across the opening of a female die, the latter having an internal surface configuration conformable with the outer encircling retaining wall surface shape of the container being formed. The thermoplastic material is then expanded into the female die with a plunger, the latter being stroked a distance sufficient to fully draw out the retaining wall section of said container but retain in covering position on the face of the plunger the material from which the bottom section of the container is formed.

The partly-formed container is then removed from the female die and is placed on a mandrel with the material from which the bottom section of the container is formed covering the head section of the mandrel. The mandrel head section preferably is designed with a configuration conformable with that of the final surface configuration of the container bottom section. A peripheral portion of the material from which the container bottom section is formed is then held against the mandrel, and while such material is still sufficiently heated to be shaped, it is worked against the mandrel head to produce the final bottom section configuration. Such working can be achieved by means of a specially designed plate member which has a bottom face configuration generally complemental with that of the mandrel head section. The container is then removed from the mandrel for further processing, as for example, adding a bail, etc.

BRIEF DESCRIPTION OF THE DRAWINGS

A fuller understanding of the nature and objects of the present invention will be had from the following detailed description when taken in conjunction with the accompanying drawings in which.

Throughout the description like reference numerals are used to indicate like parts in the drawings.

DESCRIPTION OF THE PREFERRED EMBODIMENT

Figure 3:
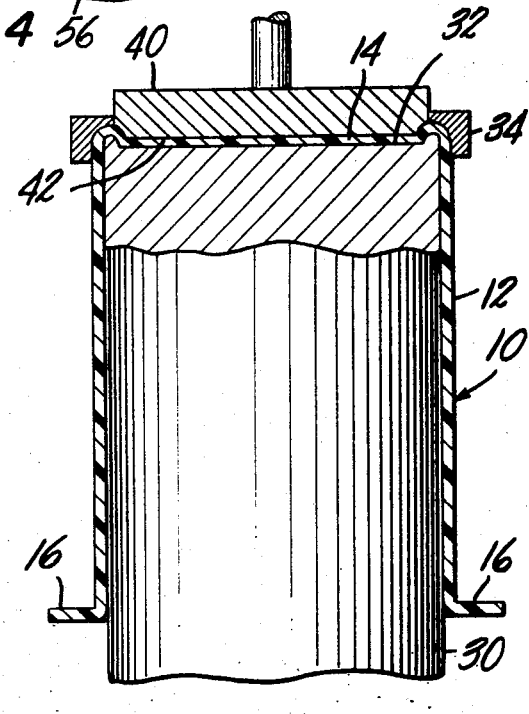
FIG. 3 is the same as FIG. 2 except it shows the forming plate member in its working position having formed the container bottom section final shape.

The present invention is concerned with the forming from thermoplastic material of hollow cup-shaped containers, more particularly relatively deep containers, as for example, pails, Referring to FIG. 3, such a pail 10 is shown in its final formed condition, the pail being shown mounted inverted on a mandrel 30 and including a relatively deep and encircling retaining wall section 12 joined integrally with a bottom section 14. The thus-formed container may also include flanges 16 at the top part thereof provided by the section of the blank sheet from which it has been formed which was retained adjacent the die opening during formation. Such flanges may be removed during finishing processing or specially shaped to provide for reception thereby of a pail cover.

Figure 1:
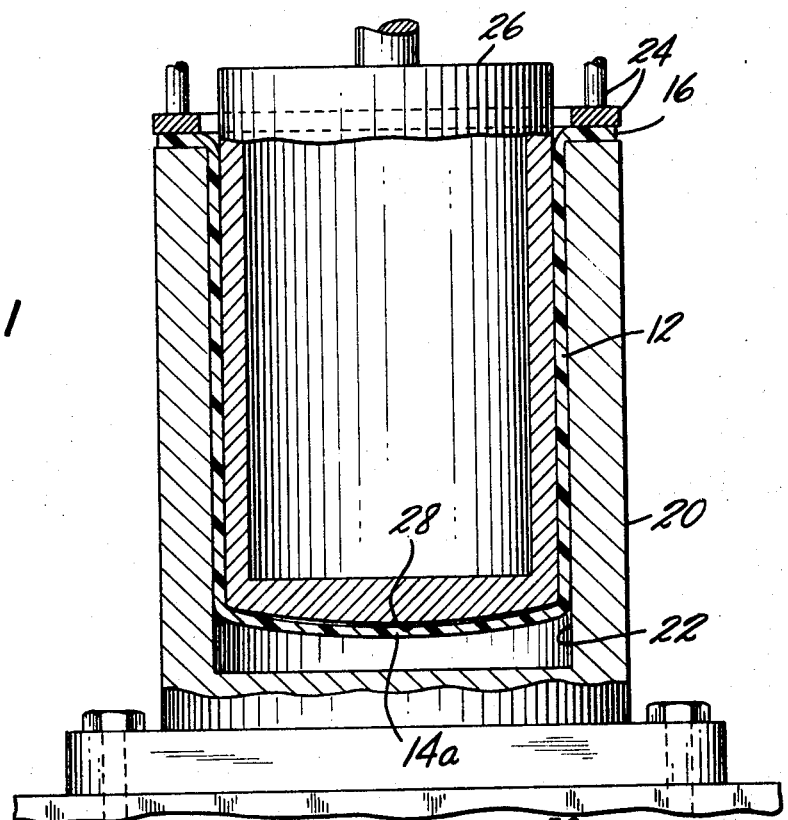
FIG. 1 is a vertical sectional view, some parts being shown in full lines of a female die assembly into which a blank sheet of thermoplastic material is expanded to form the encircling wall portion of a relatively deep container, the plunger with which the thermoplastic material is expanded into the die being shown at the bottom of the expansion stroke.
Figure 2:
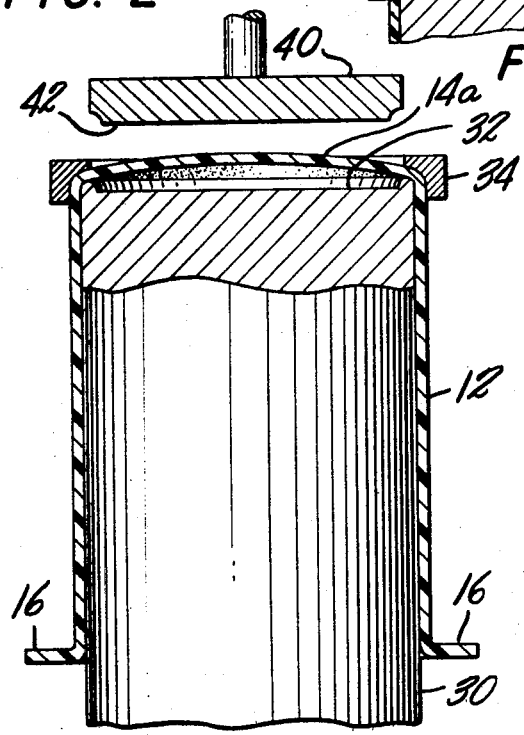
FIG. 2 is a vertical sectional view illustrating the mounting of the partly-formed container on a mandrel, the container being received on the latter in inverted position and a peripheral portion of the container bottom section being held against the mandrel with a locking ring, said view further illustrating the forming plate member with which the final bottom section configuration is produced.

Turning to a consideration of the specific processing steps of the present invention and with continuing reference to FIGS. 1–3, a blank sheet of thermoplastic material is received across the opening of a female die 20, the latter having a relatively deep cavity 22, the internal surface configuration of which conforms generally with the external surface of the container encircling wall section. As seen in FIG. 1 the blank is retained along an annular edge portion thereof adjacent the die element opening with any suitable holding device 24 operable to hold the blank tightly during the drawing thereof. The blank is expanded into the die cavity by means of a forming plunger 26, the stroke of the latter during the deep draw operation being such as to fully draw out the retaining wall section 12 but retain in covering position on the face 28 of the plunger the material 14a from which the container bottom section is to be formed. After the plunger 26 has been stroked its full drawing distance, it may be allowed to remain in such position for a number of seconds to allow the shaped container structure to set to a certain degree to prevent collapse thereof upon removal from the die element. Such set, of course, could be achieved in other ways. For example, chilling, air blow cooling and the like could also be used to provide the proper degree of set in the container material. When sufficient degree of set has been achieved, the plunger 26 is retracted from the die element and the partly-formed container is removed from the die and/or the plunger and transferred to a special mandrel 30 shown in FIG. 2, the container being received preferably in inverted position on the mandrel in the manner illustrated. The container may also be received on a mandrel device in any suitable orientation to permit the further processing of the container.

The mandrel 30 can be made from any suitable material and can be either a solid or hollow built-up member. The mandrel is provided with a head section as at 32 which has a configuration generally conformable with that of the intended final configuration to be provided in the container bottom section, the surface of the head section preferably being flat, although it will be understood that the container bottom configuration could provide for strengthening emboss patterns, reinforcing rings and the like and the head section would be correspondingly shaped to produce such configuration. The partly-formed container at this point in the process may have a slight convex bottom section represented by the material 14a which covered the face of plunger 26 during the stroking in the die element 20, and such material still retains a sufficient amount of heat to be worked or plastically deformed. While the material is still in such condition, desirably a peripheral portion of the bottom section material 14a is held against the mandrel, a suitable holding ring 34 being provided for that purpose, the holding ring being an annular element as illustrated in FIG. 2.

The final formation of the container bottom section is then effected by working the material 14a against the head of the mandrel and for that purpose a suitably configured plate member 40 may be employed, the lower face 42 of the plate member 40 being complementary configured with head section of the mandrel. In working the material 14a against the mandrel head such working is done with application of pressure applied uniformly across the expanse of the material disposed over the mandrel head and preferably normally to the surface of the head section, such action being illustrated by FIG. 3 wherein the plate member 40 has moved to final forming position. The plate member 40 is allowed to remain in its lower position for a short period during which the container bottom section is allowed to set to prevent its collapse. The plate member then is retracted upwardly and the finally formed container can be removed from the mandrel for further processing as, for example, addition thereto of a bail, etc.

Figure 4:
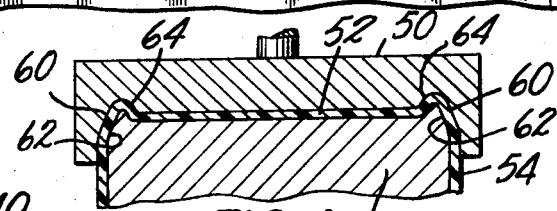
FIG. 4 is a fragmentary sectional view of another form of forming plate member which can be used for forming the final shape of the container bottom section.

As can be noted with reference to FIG. 4, it is not necessary that a holding ring be used during final formation of the container bottom section. Thus it will be seen that plate member 50 can be used to work the material of the bottom section 52 of container 54 against the head of mandrel 56 without reliance on any holding means. The plate member 50 and the mandrel head are complementaly configured, the depicted forms being provided with tapered segments as at 60 and 62 respectively to give the container bottom edge periphery a taper to facilitate nesting the finished container on the cover of a like container. Further, the depicted forms have radius segments as at 64 to provide an upward step in the container bottom.

What is claimed is:
1. A method for forming a hollow cup-shaped container having an encircling retaining wall section joined integrally with a bottom section which comprises receiving a sheet blank of thermoplastic material of a certain thickness and which has been heated to just below molten condition in a covering position over the opening of a die having a relatively deep cavity of a shape conforming in configuration with the external surface configuration of the retaining wall section of said container, holding an annular portion of said blank adjacent said opening while expanding the remainder thereof into said die cavity with a plunger to force said blank into overall surface engagement with the die cavity, said plunger being stroked into said cavity a distance sufficient to fully draw out the retaining wall section of said container and thereby partly form said container but retain in covering position across the face of said plunger, the material from which said bottom section is formed, removing the partly-formed container from said die while the material from which the container bottom section is formed is still sufficiently heated to be plastically deformed and receiving it on a mandrel which has a head section, the surface of which is conformable to that of the intended surface configuration of the container bottom section, the partly-formed container being received on said mandrel with the material from which the container bottom section is formed covering said head section, holding a peripheral portion of the material covering said mandrel head tightly against the surface of the latter, and then working said material against the surface of the mandrel head section with a force applied uniformly across the expanse of the material disposed over said mandrel head and substantially normally to said surface to form the bottom section of said container, the working of material against the head section of said mandrel being effected with a plate member, said plate member having a working surface, the holding of the peripheral portion of said material being effected with an annular holding ring, said plate member being stroked through said holding ring to work said material against the head section, the head section of said mandrel and the working surface of said plate member being complementally shaped.

References Cited
UNITED STATES PATENTS

| | | | |
|---|---|---|---|
| 3,184,524 | 5/1965 | Whiteford | 264—294 X |
| 3,487,139 | 12/1969 | Mojonnier | 264—296 X |
| 1,776,888 | 9/1930 | Clark | 264—296 |
| 3,234,310 | 2/1966 | Edwards | 264—296 X |
| 3,214,797 | 11/1965 | Ollier | 264—296 X |

FOREIGN PATENTS

| | | | |
|---|---|---|---|
| 768,056 | 9/1967 | Canada | 264—294 |

ROBERT F. WHITE, Primary Examiner

R. R. KUCIA, Assistant Examiner

U.S. Cl. X.R.

264—296, 322